(12) United States Patent
Kim et al.

(10) Patent No.: US 9,596,056 B2
(45) Date of Patent: Mar. 14, 2017

(54) METHOD FOR INTERFERENCE CANCELLATION IN WIRELESS COMMUNICATION SYSTEM AND APPARATUS THEREFOR

(71) Applicant: LG Electronics Inc., Seoul (KR)

(72) Inventors: Eunsun Kim, Seoul (KR); Jonghyun Park, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 217 days.

(21) Appl. No.: 14/331,350

(22) Filed: Jul. 15, 2014

(65) Prior Publication Data

US 2015/0016361 A1    Jan. 15, 2015

Related U.S. Application Data

(60) Provisional application No. 61/846,080, filed on Jul. 15, 2013.

(51) Int. Cl.
| | |
|---|---|
| *H04L 1/00* | (2006.01) |
| *H04J 11/00* | (2006.01) |
| *H04L 1/16* | (2006.01) |
| *H04L 1/18* | (2006.01) |
| *H04L 5/00* | (2006.01) |

(52) U.S. Cl.
CPC .......... *H04L 1/0061* (2013.01); *H04J 11/004* (2013.01); *H04L 1/0041* (2013.01); *H04L 1/1671* (2013.01); *H04L 1/1861* (2013.01); *H04L 5/0035* (2013.01); *H04L 5/0073* (2013.01); *H04L 5/0091* (2013.01)

(58) Field of Classification Search
CPC ............. H04J 11/004; H04L 1/00; H04L 5/00
USPC ......................................... 370/329
See application file for complete search history.

(56) References Cited

U.S. PATENT DOCUMENTS

| | | | |
|---|---|---|---|
| 2010/0173659 A1* | 7/2010 | Shin ..................... | H04B 7/0452 455/500 |
| 2011/0070845 A1* | 3/2011 | Chen ...................... | H04L 5/001 455/91 |
| 2011/0194511 A1* | 8/2011 | Chen ................... | H04W 72/121 370/329 |
| 2012/0057540 A1* | 3/2012 | Fang ..................... | H04B 7/024 370/329 |

\* cited by examiner

*Primary Examiner* — Mohammad Anwar
*Assistant Examiner* — Kokou R Detse
(74) *Attorney, Agent, or Firm* — Morgan, Lewis & Bockius LLP

(57) ABSTRACT

In an aspect of the present invention, provided herein is a method for receiving information for interference cancellation of a mobile terminal, the method comprising: receiving, from a base station, multi-user downlink control information (MU DCI) including CRC scrambled with an identifier (ID) of a user group, the MU DCI including control information for a plurality of mobile terminals belonging to the user group, information indicating the number of mobile terminals simultaneously scheduled by the MU DCI in a subframe, and an index allocated to each mobile terminal being added to the end of the control information for each mobile terminal; and receiving downlink data for other mobile terminals in the user group using the control information for the other mobile terminals if the control information for the mobile terminal is included in the MU DCI.

10 Claims, 10 Drawing Sheets

FIG. 5
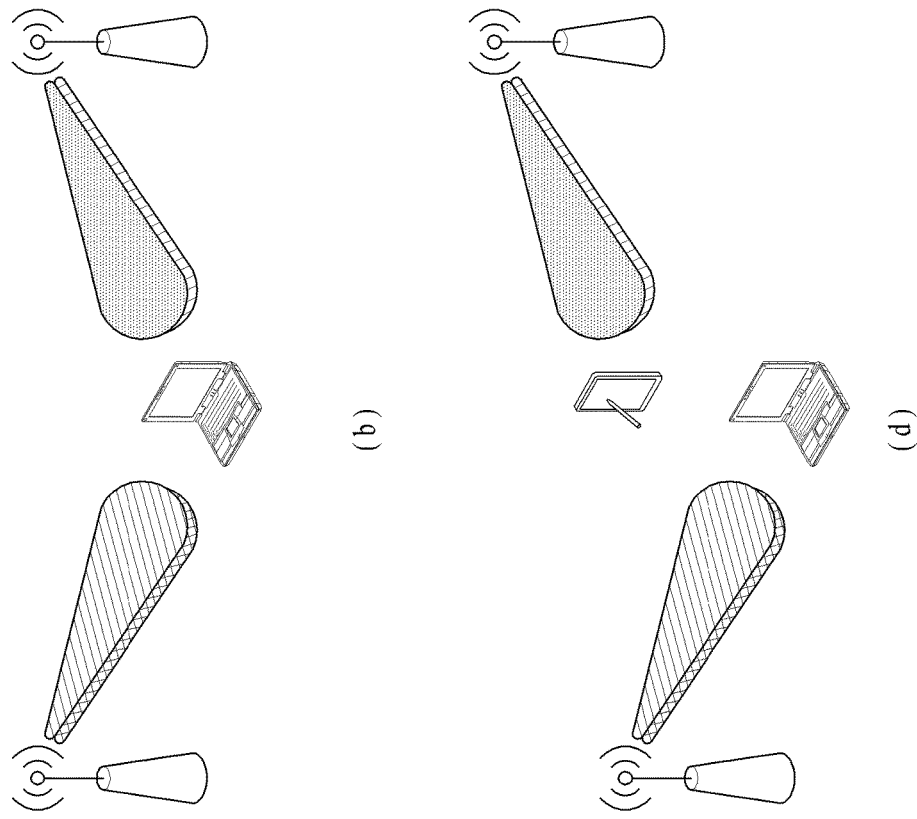
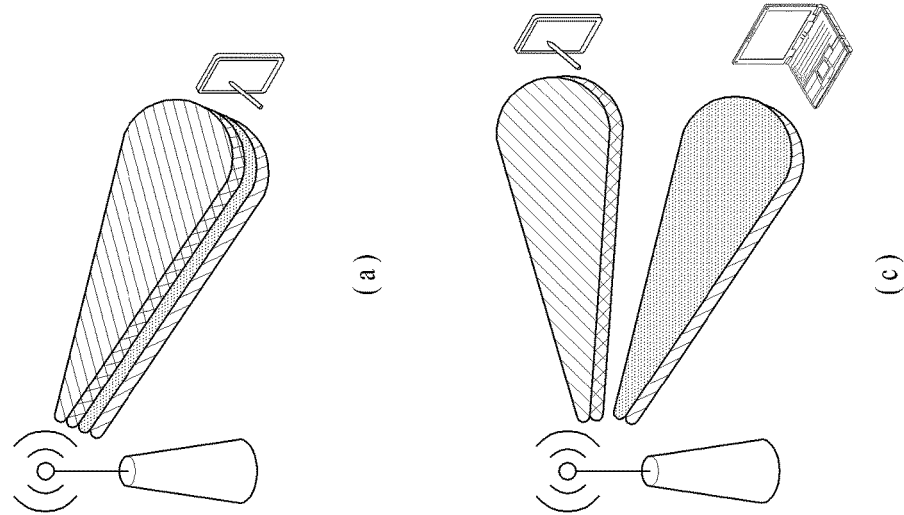

METHOD FOR INTERFERENCE CANCELLATION IN WIRELESS COMMUNICATION SYSTEM AND APPARATUS THEREFOR

This application claims the benefit of U.S. provisional application No. 61/846,080, filed on Jul. 15, 2013, which is hereby incorporated by reference as if fully set forth herein.

BACKGROUND OF THE INVENTION

Field of the Invention

The present invention relates to a method for interference cancellation in a wireless communication system and an apparatus therefor.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

The present invention is directed to a method for efficiently supporting interference cancellation in a wireless communication system that substantially obviates one or more problems due to limitations and disadvantages of the related art.

In an aspect of the present invention, provided herein is a method for receiving information for interference cancellation of a mobile terminal, the method comprising: receiving, from a base station, multi-user downlink control information (MU DCI) including CRC scrambled with an identifier (ID) of a user group, the MU DCI including control information for a plurality of mobile terminals belonging to the user group, information indicating the number of mobile terminals simultaneously scheduled by the MU DCI in a subframe, and an index allocated to each mobile terminal being added to the control information for each mobile terminal; and receiving downlink data for other mobile terminals in the user group using the control information for the other mobile terminals if the control information for the mobile terminal is included in the MU DCI.

Alternatively or additionally, the method may further comprise receiving the index allocated to each of the plurality of mobile terminals from the base station.

Alternatively or additionally, if resource regions of downlink data for the plurality of mobile terminals fully overlap, the MU DCI may include common resource region information for all the plurality of mobile terminals.

Alternatively or additionally, the method may further comprise transmitting, to the base station, feedback on a result of reception of downlink data for the mobile terminal or downlink data for the other mobile terminals, wherein the feedback may be transmitted a resource region determined based on the index allocated to the mobile terminal.

Alternatively or additionally, the method may further comprise performing interference cancellation using the received downlink data for the other mobile terminals.

Alternatively or additionally, the method may further comprise receiving information related to a neighbor base station if a mobile terminal scheduled by the neighbor base station belongs to the user group.

Alternatively or additionally, the MU DCI may be transmitted in a search space determined based on the ID of the user group.

Alternatively or additionally, the user group may be composed of mobile terminals having downlink channel state within a specific range.

Alternatively or additionally, the user group may be composed of mobile terminals set to the same transmission mode.

In another aspect of the present invention, provided herein is a mobile terminal having interference cancellation capability in a wireless communication system, comprising: a radio frequency (RF) unit; and a processor configured to control the RF unit, wherein the processor is configured to receive, from a base station, multi-user downlink control information (MU DCI) including CRC scrambled with an identifier (ID) of a user group, the MU DCI including control information for a plurality of mobile terminals belonging to the user group, information indicating the number of mobile terminals simultaneously scheduled by the MU DCI in a subframe, and an index allocated to each mobile terminal being added to the control information for each mobile terminal, and to receive downlink data for other mobile terminals in the user group using the control information for the other mobile terminals if the control information for the mobile terminal is included in the MU DCI.

According to an embodiment of the present invention, interference cancellation can be efficiently performed in a wireless communication system.

In addition, according to an embodiment of the present invention, information about a specific reference signal from a cell that may cause interference can be signaled to a UE, to achieve efficient interference cancellation.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 shows various multi-input multi-output (MIMO) environments in a 3GPP LTE/LTE-A system;

DETAILED DESCRIPTION OF THE INVENTION

Figure 1:
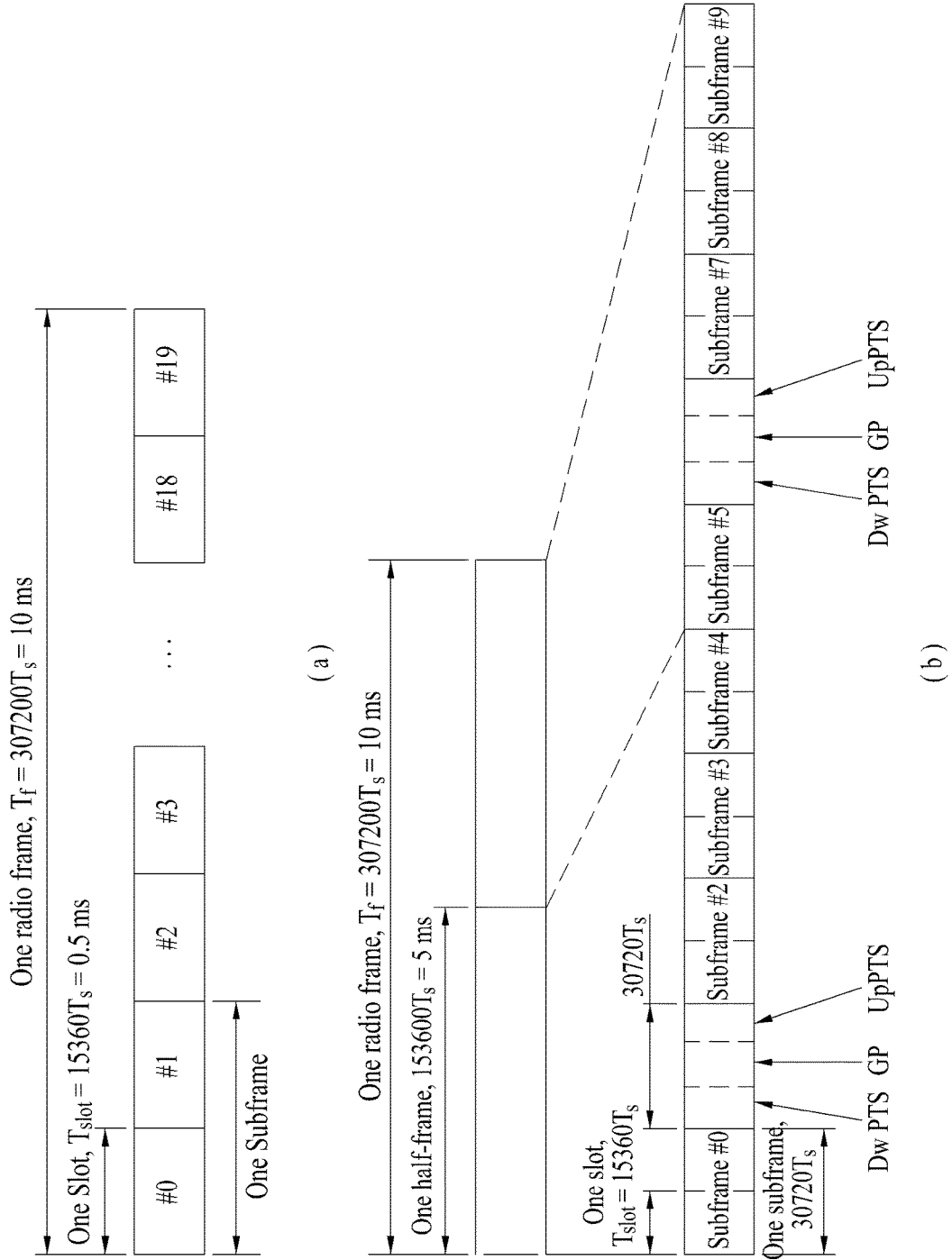
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3 GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
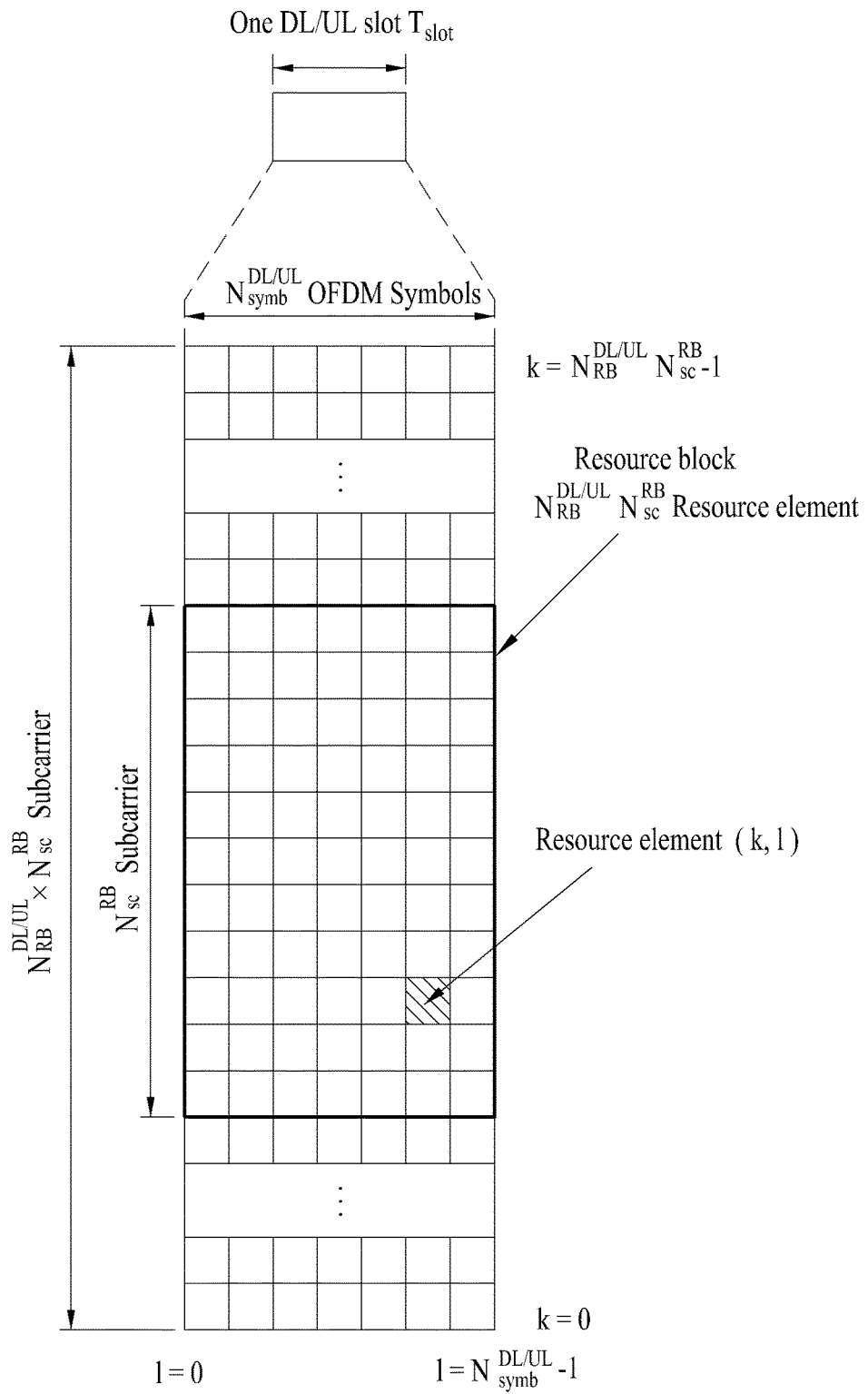
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index).

Figure 3:
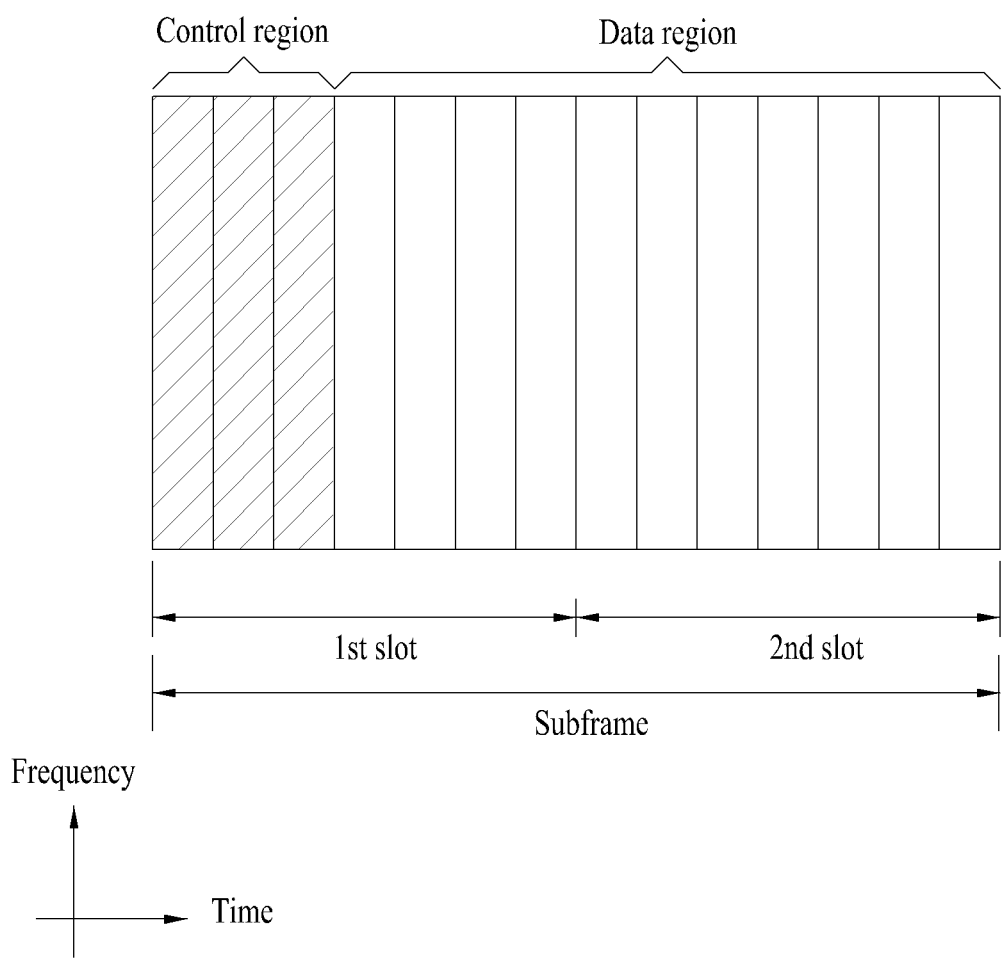
FIG. 3 is a diagram showing a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter.

Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
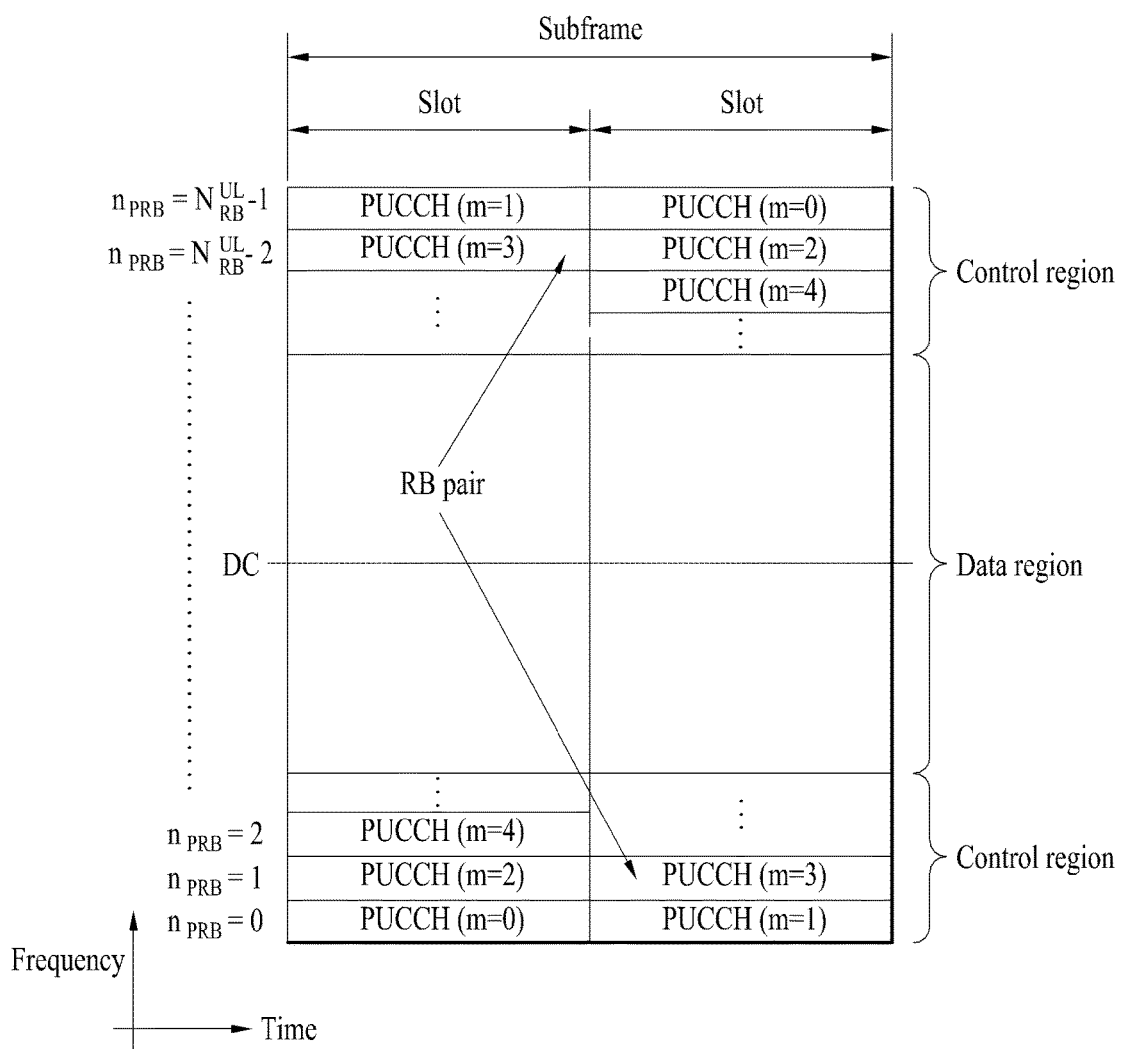
FIG. 4 is a diagram showing an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Coordinated Multi-Point (CoMP) Transmission and Reception

According to improved system performance requirements of a 3GPP LTE-A system, CoMP transmission/reception technology (co-MIMO, collaborative MIMO or network MIMO) is proposed. CoMP technology may increase performance of a UE located at a cell edge and increase average sector throughput.

In general, in a multi-cell environment in which a frequency reuse factor is 1, performance and average sector throughput of a UE located at a cell edge may be reduced due to inter-cell interference (ICI). In order to reduce ICI, in a legacy LTE system, a method of enabling a UE located at a cell edge to have appropriate throughput and performance in an environment restricted by interference using a simple passive method such as fractional frequency reuse (FFR) via specific power control was applied. However, ICI is reduced or reused by a UE as a desired signal more preferably than reduction of frequency resources used per cell. In order to accomplish the above-described object, a CoMP transmission scheme is applicable.

The CoMP scheme applicable to downlink may be largely divided into a joint processing (JP) scheme and a coordinated scheduling/beamforming (CS/CB) scheme.

In the JP scheme, each point (BS) of a CoMP unit may use data. The CoMP unit refers to a set of BSs used in the CoMP scheme. The JP scheme may be classified into a joint transmission scheme and a dynamic cell selection scheme.

The joint transmission scheme refers to a scheme for simultaneously transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively cancel interference with another UE.

The dynamic cell selection scheme refers to a scheme for transmitting a PDSCH from one point (of the CoMP unit). That is, data transmitted to a single UE at a specific time is transmitted from one point and the other points in the coordinated unit do not transmit data to the UE at that time. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination among a plurality of geographically separated points. CoMP schemes applicable to uplink may be classified into Joint Reception (JR) and Coordinated Scheduling/Beamforming (CS/CB).

JR indicates that a plurality of reception points receives a signal transmitted through a PUSCH, the CS/CB scheme indicates that only one point receives a PUSCH, and user scheduling/beamforming is determined by the coordination of the cells of the CoMP unit.

A plurality of UL points (that is, receiving points (RPs)) is referred to as UL CoMP and a plurality of DL points (that is, transmitting points (TPs)) is referred to as DL CoMP.

In 3GPP LTE Rel-11, a UE acting as a target of the CoMP scheme can estimate a channel of TPs capable of provisionally participating in the CoMP using CSI-RS (channel state information reference signal) resources defined as a CoMP measurement set, and feeds back CSI (such as PMI (precoding matrix indicator), CQI (channel quality indicator), RI (rank indicator), etc.) to its own serving cell on the basis of the estimated channel value. In the network, the UE may establish a Dynamic Point Selection (DPS) scheme in which is a TP having a relatively-superior channel quality is selected on the basis of the feedback CSI and data is transmitted to the UE, the CS/CB (coordinated scheduling/coordinated beamforming) scheme in which TPs participating in the CoMP control scheduling and beamforming so as to reduce inter-interference, and a Joint Transmission (JT) scheme in which TPs participating in the CoMP transmit the same data to the UE.

Enhanced-PDCCH (EPDCCH)

In an LTE system of LTE Release 11 or later, as a solution for PDCCH capacity lack due to CoMP, multi user-multiple input multiple output (MU-MIMO) and PDCCH performance reduction due to inter-cell interference, an enhanced-PDCCH (EPDCCH) which may be transmitted via a conventional PDSCH region is considered. In the EPDCCH, in order to obtain precoding gain, unlike to an existing CRS based PDCCH, channel estimation may be performed based on a DMRS.

EPDCCH transmission may be divided into localized EPDCCH transmission and distributed EPDCCH transmission according to the configuration of a PRB pair used for EPDCCH transmission. Localized EPDCCH transmission means the case in which enhanced control channel elements (ECCEs) used to transmit one piece of DCI are contiguous in the frequency domain and specific precoding is applicable in order to obtain beamforming gain. For example, localized EPDCCH transmission may be based on consecutive ECCEs corresponding in number to an aggregation level. In contrast, distributed EPDCCH transmission means that one EPDCCH is transmitted on a PRB pair separated in the frequency domain and has frequency diversity gain. For example, distributed EPDCCH transmission may be based on ECCEs each including enhanced resource element groups (EREGs) included each PRB pair separated in the frequency domain.

A UE may perform blind decoding similarly to an existing LTE/LTE-A system, in order to receive/acquire control information (DCI) via an EPDCCH. More specifically, the UE may attempt (monitor) decoding of a set of EPDCCH candidates per aggregation level, for DCI formats corresponding to a configured transmission mode. Here, the set of EPDCCH candidates to be monitored may be referred to as an EPDCCH UE-specific search space and this search space may be set/configured per aggregation level. In addition, differently from the above-described existing LTE/LTE-A system, {1, 2, 4, 8, 16, 32} is possible as an aggregation level according to subframe type, CP length, the amount of available resources in a PRB pair, etc.

A UE, in which an EPDCCH is configured, indexes REs included in a PRB pair set in EREG units and indexes the EREGs in ECCE units. The UE may determine EPDCCH candidates configuring a search space based on the indexed ECCEs to perform blind decoding, thereby receiving control information. Here, the EREG corresponds to an REG of the existing LTE/LTE-A system and the ECCE corresponds to a CCE. One PRB pair may include 16 EREGs.

In addition, for each serving cell, one UE may configure one or two EPDCCH PRB sets for PDCCH monitoring via higher layer signaling.

In 3GPP LTE Rel-11, a UE, to which a CoMP scheme is applied, may estimate channels of TPs, which may potentially participate in CoMP, using channel state information-reference signal (CSI-RS) resources defined as a CoMP measurement set and feed CSI such as precoding matrix indicator (PMI), channel quality indicator (CQI) or rank indicator (RI) back to a serving cell thereof based on the estimated channel values. A network may configure a dynamic point selection (DPS) scheme for selecting a TP having relatively excellent channel quality based on the fed-back CSI information to enable the UE to perform data transmission, a coordinated scheduling/coordinated beamforming (CS/CB) scheme for, at TPs participating in CoMP, controlling scheduling and beamforming to reduce mutual interference and a joint transmission (JT) scheme for, at TPs participating in CoMP, transmitting the same data to the UE.

The present invention relates to information provided by a network (or an eNB) and an inter-network coordination scheme in order to improve received signal performance of a UE including a high-performance receiver having interference cancellation (IC) capabilities.

In general, a cellular mobile communication system is an interference-limited system due to inter-cell interference in an urban environment and reaches system capacity limit. In addition, if a MIMO scheme, that is, an SU-MIMO scheme or a MU-MIMO scheme, is applied such that one eNB transmits a multi-layer signal of multiple beams, inter-layer interference in a cell is also a main factor for deciding system capacity limit. Therefore, in order to reduce inter-cell interference and intra-cell interference, standardization and development of a coordinated transmission and high-performance receiver scheme becomes important and numerous efforts in that direction have been made.

A downlink CoMP scheme configures transmission beams such that inter-cell interference and intra-cell interference are minimized in a transmitter based on channel state information received from a receiver. In the downlink CoMP scheme, complexity of the UE in a data reception process is not increased, but performance of the CoMP scheme largely depends on accuracy of a channel state information report. The high-performance receiver scheme obtains better reception performance using properties of an interference signal at a receiver. In the high-performance receiver scheme, how the UE acquires information on the interference signal transmitted along with a signal (that is, a desired signal)

scheduled thereto becomes important. Representative examples of the high-performance receiver scheme may include:
   linear MMSE IRC receiver,
   maximum likelihood detection receiver, and
   interference cancellation receiver.

As performance increases, information on a larger number of interference signals is required. For example, in an iterative decoding interference cancellation receiver known to have highest performance, since a UE decodes an interference signal and regenerates an interference signal in order to cancel interference, all information for decoding the interference signal is necessary.

In the present specification, a method for cancelling an interference signal from a received signal after decoding and regenerating the interference signal will be focused upon.

First, as interference received by a specific UE, there may be a signal of another layer scheduled to the specific UE. As shown in FIGS. 5(a) and 5(b), in case of single-cell SU-MIMO and multi-cell SU-MIMO, interference from another layer co-scheduled to a specific RB must be cancelled. In this case, all necessary information for interference cancellation is included in a DL control channel transmitted to a UE.

Unlike FIGS. 5(a) and 5(b), in FIGS. 5(c) and 5(d), when a UE receives control information of a PDSCH, control information of an interference signal is not received. FIGS. 5(c) and 5(d) show examples of single-cell SU-MIMO and multi-cell SU-MIMO, respectively. In the present specification, a method for improving interference cancellation performance of a receiver of a UE in the examples shown in FIGS. 5(c) and 5(d) is proposed.

Hereinafter, embodiment(s) of the present invention will be described. In the present specification, assume that a signal received by a UE includes a desired signal and an interference signal. That is, the desired signal is a downlink signal scheduled to the UE and the interference signal corresponds to a downlink signal scheduled to UE(s) different from the UE.

Information about an interference signal may be included in control information (downlink control information: DCI) about a desired signal and dynamically transmitted. An eNB may transmit additional information about an interference signal along with control information about a desired signal to a UE.

Embodiments of the present invention relate to network signaling for aiding in interference cancellation of a target UE when a network performs multi-cell MU-MIMO scheduling as shown in FIG. 5(d). In the embodiment illustrated in FIG. 5(d), a plurality of UEs is scheduled in the same physical resource block (PRB) and a target UE can receive, from a serving cell thereof, assistance information for eliminating interference of an interference signal in order to improve signal reception performance.

To achieve this, the UE needs to know scheduling information of a neighbor eNB, and thus network coordination between eNBs is needed. A degree of coordination between eNBs and information type that can be signaled to a UE may depend on the rate and latency of a backhaul link between eNBs Backhaul links can be classified into three types.

Ideal backhaul (non-X2) link: Coordinating eNBs form a CoMP cluster as considered in Rel-11 CoMP. Cells in the same CoMP cluster can perform coordinated scheduling since the cells are connected through a backhaul link such as an optical fiber having high capacity and low latency for coordinated scheduling and coordinated data transmission and reception and can carry out coordinated data transmission since the cells are correctly synchronized. It is assumed that a difference between reception timings of signals transmitted from cells in a CoMP cluster, which participate in coordinated transmission, caused by a propagation delay difference between cells is within the cyclic prefix (CP) length of OFDM symbols when signals transmitted from the cells in the CoMP cluster are received. In this case, necessary information including dynamic information that may be varied per subframe can be provided to a UE with accuracy through dynamic signaling in order to aid in interference cancellation of the UE per subframe.

Low backhaul link: this is a normal backhaul link having a latency in the range of several ms to tens of ms and cannot transmit dynamic information for coordination between eNBs. On this link, eNBs can merely cooperate to transmit semi-static information to neighbor eNBs.

High backhaul link: this is an intermediate backhaul link between the ideal backhaul link and the low backhaul link and may achieve fast coordination between eNBs (having a latency of less than 1 ms, for example). Limited information other than semi-static neighbor eNB information can be signaled to the UE through dynamic signaling to aid in interference cancellation of the UE.

Multi-User DCI (Downlink Control Information)

To cancel interference from UEs scheduled in the same resource or a partially overlapping resource region, information on the corresponding UEs is received from the serving cell and interference cancellation (IC) is performed using the received information. The present invention defines MU DCI (multi-user downlink control information) and proposes a method for operating the MU DCI. Conventional DCI provides only control information about a UE, whereas MU DCI carries control information about a plurality of UEs. Upon reception of MU-DCI, a UE receives control information therefor in part of the DCI field and receives control information for another UE in the remaining region. The UE receives/demodulates/decodes a PDSCH transmitted thereto using the control information therefor, receives/demodulates/decodes a PDSCH transmitted to the other UE using the control information for the other UE and uses the PDSCH to cancel interference. Embodiments of the present disclosure follow with reference to FIGS. 6 to 8. Specific field(s) and its order are exemplary, so additional field(s) may be added or fields depicted in FIGS. 6 to 8 may be reconfigure with different order.

Figure 6:
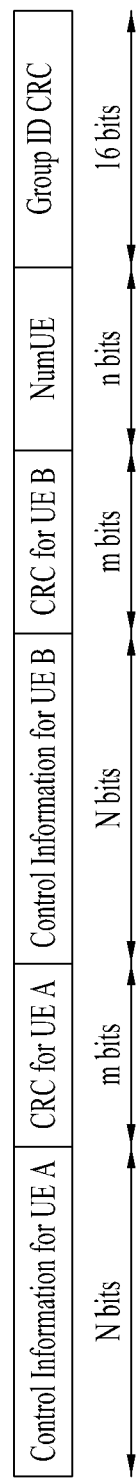
FIG. 6 illustrates a multi-user downlink control information according to one embodiment of the present invention.

FIG. 6 illustrates exemplary MU DCI according to an embodiment of the present invention. In FIG. 6, UEs A and B are grouped and the MU DCI is transmitted thereto. CRC bits masked with a C-RNTI of UE A follow control information for UE A and CRC bits masked with a C-RNTI of UE B follow control information for UE B. In this manner, control information fields for the UEs are discriminated from each other in an MU DCI field. Then CRC masking is performed using a group ID to indicate that the MU DCI is for the corresponding group. The CRC bits following the control information for each UE are generated using only control information transmitted to each UE and finally added CRC bits are generated using all pieces of control information and CRC-masked with the group ID For example, when UE A, UE B, UE C and UE D are grouped into one group, information on UE grouping needs to be signaled. An eNB needs to group a plurality of UEs that the eNB attempts to simultaneously schedule through MU DCI. UEs scheduled through MU DCI are UEs scheduled in the same resource region or in a partially overlapping resource region. Even when UEs belong to one group, all the UEs belonging to the group may not be simultaneously scheduled at every scheduling timing.

UE Grouping

UE grouping can be performed based on CSI feedback of a UE. UEs having similar long term CSI (W1) values reported thereby can be grouped. Since UEs need to decode interference signals of other UEs, UEs having similar SINRs, that is, similar reported MCS values can be grouped.

UE Grouping Information Signaling

Figure 7:
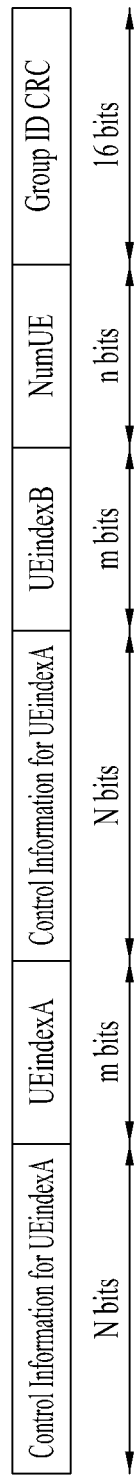
FIG. 7 illustrates a multi-user downlink control information according to one embodiment of the present invention.

Upon completion of UE grouping, the eNB needs to allocate a group ID to each group and can provide the group ID and information on grouped UEs to UEs belonging to each group. For example, when UEs A, B, C and D are grouped into UE group 1, the eNB can inform the UEs of a UD group ID=X and UE ID={A, B, C, D} of the UEs belonging to the UE group 1. Here, C-RNTIs of UEs A, B, C and D may be signaled as UE IDs. In this case, "CRC for UE A" and "CRC for UE B" fields can be respectively CRC-masked with C-RNTIs of UE A and UE B and "group ID CRC" field can be CRC-masked with the UE group ID in the embodiment of FIG. 6. However, since contiguous disposition of CRC masked with a UE group ID and CRC for each UE in a group in DCI may cause excessive overhead, an additional UE index in addition to C-RNTIs of UEs is preferably assigned and signaled in order to reduce such overhead. FIG. 7 illustrates exemplary MU DCI in which UE index instead of CRC is added to the end of control information for each UE.

The simplest method of allocating an additional index to a UE in a group is to assign a code value per UE. When the number of UEs grouped into one group is 4, the UEindex field in FIG. 7 corresponds to 2 bits and codes of {00, 01, 10, 11} are allocated to the 4 UEs. That is, UE A=01, UE B=10, UE C=00 and UE D=11 are allocated. Allocation of the code values is signaled as follows.

UE group ID=X
UEs in UE group ID X={01, 10, 00, 11}

Upon signaling of the code values, a UE recognizes that 4 UEs having UE indices of 01, 10, 00 and 11 belong to one group. Here, the eNB and UEs need to determine that a UE corresponding to a specific order, for example, the first signaled index indicates the corresponding UE. Accordingly, the UE signaled by the eNB can check the position corresponding to a UE index field value of "01" and confirm that the field prior to the position indicates control information therefor in order to decode the control information therefor. Here, control information coding order can be determined based on code values in the MU DCI field. That is, control information for a UE corresponding to UE index "00", control information for a UE corresponding to UE index "01", control information for a UE corresponding to UE index "10" and control information for a UE corresponding to UE index "11" are sequentially disposed. Accordingly, the UE that has received the MU DCI can smoothly decode a PDCCH and obtain information on a PDSCH that needs to be received by the UE and information on a PDSCH that needs to be removed as interference.

For more correct signaling, C-RNTIs of the grouped UEs may be explicitly signaled. In addition, a UE index additionally allocated for MU DCI per C-RNTI is signaled UE group ID=X
UEs in UE group ID X=
{C-RNTI A=01,
C-RNTI B=10,
C-RNTI C=00,
C-RNTI D=11}

MU DCI Field Configuration

The MU DCI field is divided into control information fields of grouped UEs and a CRC field according to a UE group ID. The UE group ID has the same length as a C-RNTI of a UE. A UE can be allocated a plurality of C-RNTIs. Like single-user DCI in which CRC for indicating control information destined for a target UE is masked with a C-RNTI behind the control information, MU DCI is configured in such a manner that CRC for indicating control information destined for a target UE group is masked with the UE group ID behind the control information and transmitted. A field for indicating the number of UEs scheduled at the corresponding time from among UEs belonging to the corresponding UE group, that is, NumUE field, is disposed prior to the CRC field according to the UE group ID, to thereby explicitly indicate the number of UEs scheduled in the MU DCI to the UEs. Control information for the grouped UEs is transmitted prior to the NumUE field. Here, the control information corresponds to control information for UEs that belong to the UE group and are scheduled at the corresponding time and the UEs have the same control information length. The control information per UE is followed by the UE index of the corresponding UE to indicate the UE related to the control information and positioning of control information for another UE following the control information of the UE.

To receive the MU DCI, the UEs belonging to the UE group perform blind detection using the UE group ID allocated thereto. UEs that have performed successful decoding through blind detection using the UE group ID can be aware of the size of the MU DCI and the number of UEs scheduled through the MU DCI in the corresponding subframe and thus sequentially decode DCI therefor. If DCI for a UE is not present, then the UE does not perform any operation. The UE can use decoded DCI of other UEs for interference cancellation only when DCI for the UE is present.

When control information for a UE is followed by CRC bits masked with the C-RNTI of the UE, as illustrated in FIG. 6, the UE can use the C-RNTI thereof to detect the control information therefor.

DCI Format in MU DCI

UEs belonging to one group need to have the same transmission mode (TM). That is, UEs set to the same TM are grouped. In this case, it is desirable that control information for respective UEs have the same length in the MU DCI. However, control information may have different lengths due to a selective field such as CIF even in the same TM. Accordingly, to prevent a control information length deviation, it is necessary to determine whether the CIF field is applied to all UEs in one group and to align RM allocation type (localized or distributed). Particularly, since the MU DCI according to an embodiment of the present invention is for interference cancellation, RB allocation to UEs in one group is preferably limited to localized type.

Figure 8:
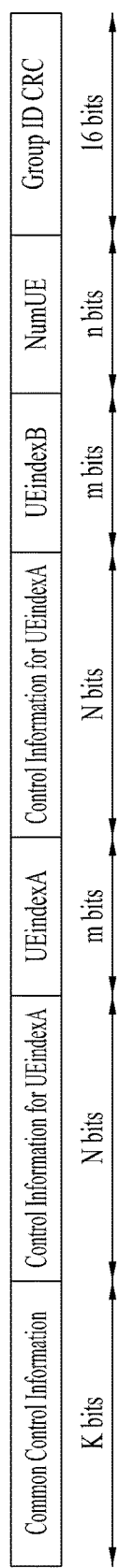
FIG. 8 illustrates a multi-user downlink control information according to one embodiment of the present invention.

When UEs are scheduled fully overlapping in the same resource region, a resource allocation field may be present per group and a resource allocation field per UE may be omitted. FIG. 8 illustrates exemplary MU DCI including control information which is common for UEs belonging to a corresponding UE group.

When UEs set to different TMs need to be grouped into one group in order to remove interference from legacy UEs, it is necessary to explicitly signal TM information per UE and used DCI format information. Preferably, a DCI format for supporting a fallback mode is not included in the MU DCI.

UE Grouping Among Inter-Cell UEs

When UEs included in one group are respectively scheduled by different cells, it may be difficult to estimate interference channels and to perform interference cancellation without additional information even if control information for the UEs is known. In this case, accordingly, virtual/physical cell IDs of cells to which the UEs grouped into the same group respectively belong, quasi co-located (QCL) information and PDSCH RE mapping and QCL indicator field (PQI) information need to be additionally transmitted to the UE belonging to the corresponding group.

DCI Search Space

The MU DCI can be transmitted in a UE-specific search space. Otherwise, the MU DCI can be transmitted in a common search space since the MU DCI is for all UEs in the UE group. Furthermore, the MU DCI can be transmitted in a search space determined based on the UE group ID.

Accordingly, a UE allocated the UE group ID for MU DCI needs to blind-detect an (E)PDCCH using a C-RNTI thereof or the UE group ID. A UE allocated the UE group ID should attempt double blind detection, compared to a UE that is not allocated the UE group ID.

ACK/NACK Feedback

When a method of using an ACK/NACK feedback resource linked to a downlink CCE index corresponding to a CCE through which MU DCI is transmitted is employed, UEs simultaneously scheduled to receive PDSCHs through the MU DCI simultaneously perform feedback using the same ACK/NACK feedback resource, causing collision. To solve this, a UE performs feedback using an ACK/NACK resource obtained by adding a UE-specific offset to the ACK/NACK feedback resource linked to the downlink CCE index corresponding to the CCE through which the MU DCI is transmitted. The UE-specific offset can be defined based on UEindex or determined by the order of control information for UE in the MU DCI.

Figure 9:
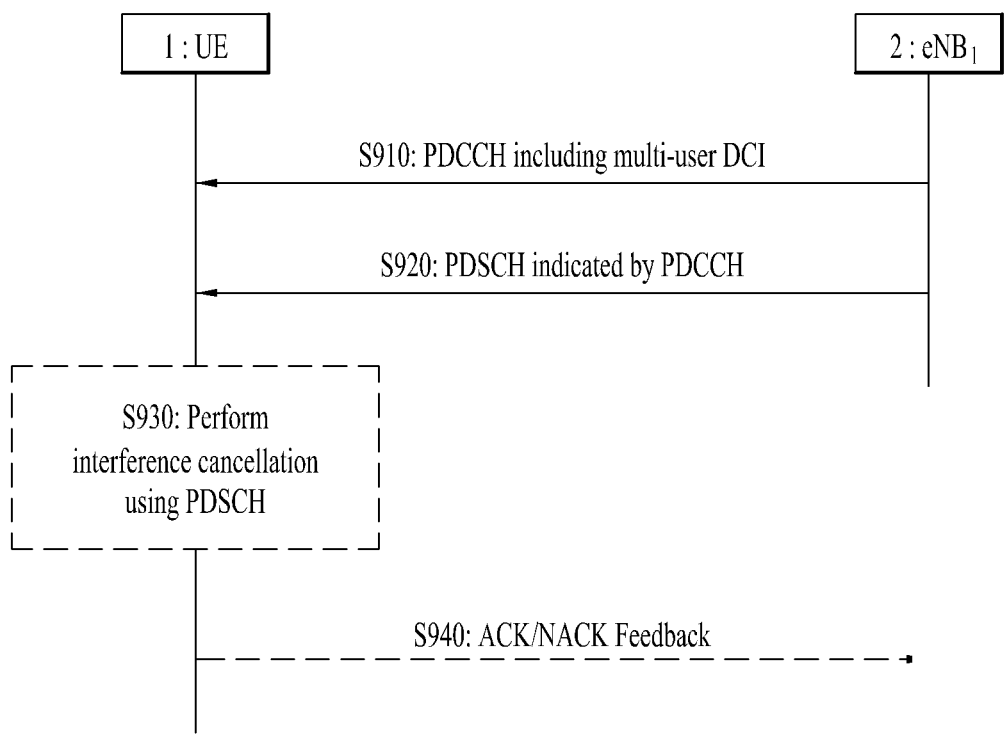
FIG. 9 is a diagram showing operation according to one embodiment of the present invention.

FIG. 9 illustrates operation according to an embodiment of the present invention. The embodiment illustrated in FIG. 9 relates to a method for receiving information for interference cancellation of a UE and a method for performing interference cancellation by the UE.

A UE 1 may receive, from an eNB 2, a downlink control channel that carries MU DCI including CRC scrambled with an ID of a UE group (S910). The MU DCI may include control information for each of a plurality of UEs belonging to the UE group and information indicating the number of individual UEs simultaneously scheduled in a corresponding subframe according to the multi-user downlink control channel. An index allocated per UE may be added to the end of control information for each UE. The index can replace CRC bits scrambled with a C-RNTI of each UE. That is, the CRC bits scrambled with the C-RNTI can be added instead of the index. Additionally or alternatively, the MU DCI may be configured in the form illustrated in FIG. 6, 7, or 8 or a combination thereof.

When control information for the UE 1 is included in the MU DCI, the UE 1 may receive downlink data channels scheduled for other UEs in the UE group using control information for the other UEs (S920). In addition the UE 1 may receive a downlink data channel scheduled therefor using the control information therefor (S920).

The UE 1 may previously receive, from the eNB, information on indexes allocated to the UEs included in the UE group to detect the MU DCI.

When resource regions of the downlink data channels scheduled for the plurality of UEs fully overlap, the MU DCI may include common resource region information for all UEs.

The UE 1 may perform interference cancellation using the received downlink data channels scheduled for the other UEs (S930). That is, since the downlink data channels scheduled for the other UEs are interference for the UE 1, the downlink data channels may be extracted from received signals of the UE 1 to be eliminated.

The UE 1 may transmit, to the eNB, feedback indicating the result of reception of the downlink data channel scheduled therefor or the downlink data channels scheduled to the other UEs (S940). Here, a resource region for feedback may be determined based on the index allocated to the UE.

Steps S930 and S940 may be selectively included in the method according to an embodiment of the present invention as indicated by dotted lines. Step S940 may precede step S930 or the two steps may be simultaneously performed.

While the embodiments of the present invention have been briefly described with reference to FIG. 9, the embodiment related to FIG. 9 may include at least part of the aforementioned embodiments alternatively or additionally.

Figure 10:
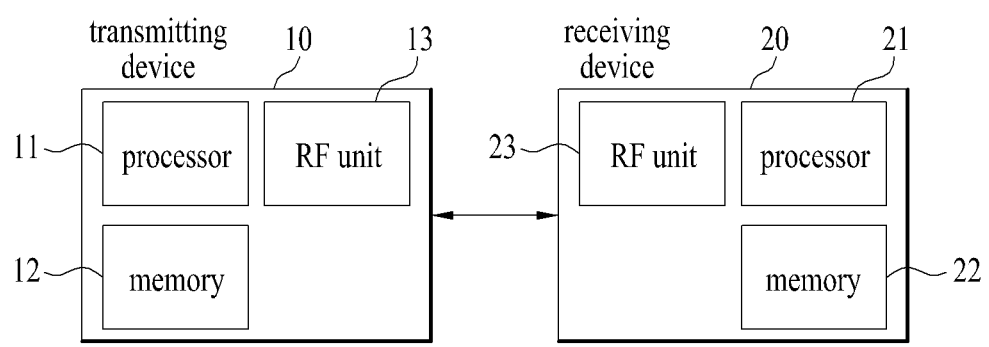
FIG. 10 is a block diagram of an apparatus for implementing embodiment(s) of the present invention.

FIG. 10 is a block diagram of a transmitting device 10 and a receiving device 20 configured to implement exemplary embodiments of the present invention. Referring to FIG. 12, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

What is claimed is:

1. A method, by a user equipment (UE), for interference cancellation in a wireless communication system, the method comprising:
receiving, from a base station (BS), multi-user downlink control information (MU DCI) including a cyclic redundancy check (CRC) scrambled with an identifier (ID) of a user group including the UE and another UE, the MU DCI including:
a control information for decoding a physical downlink shared channel (PDSCH) for the UE;
another control information for decoding another PDSCH for the another UE;
an index allocated to the UE; and
another index allocated to the another UE;
decoding the PDSCH using the control information and the index allocated to the UE; and
decoding the another PDSCH using the another control information and the another index allocated to the another UE.

2. The method according to claim 1, wherein:
the control information includes resource allocation information for the PDSCH; and
the another control information includes another resource allocation information for the another PDSCH.

3. The method according to claim 1, wherein, if downlink (DL) resource regions of the PDSCH and the another PDSCH fully overlap, the MU DCI includes common resource region information for the UE and the another UE.

4. The method according to claim 1, wherein an uplink (UL) resource region for a feedback on a result of reception of the PDSCH and another UL resource region for another feedback on a result of reception of the another PDSCH are determined based on the index allocated to the UE and the another index allocated to the another UE, respectively.

5. The method according to claim 1, further comprising performing interference cancellation using the decoded another PDSCH.

6. The method according to claim 1, wherein the user group comprises UEs having similar signal to interference-plus-noise ratios (SINRs) or modulation coding scheme (MCS) values.

7. The method according to claim 1, wherein the MU DCI is transmitted in a search space determined based on the ID of the user group.

8. The method according to claim 1, wherein the user group comprises UEs having downlink channel state within a specific range.

9. The method according to claim 1, wherein the user group comprises UEs set to the same transmission mode.

10. A user equipment (UE) having interference cancellation capability in a wireless communication system, comprising:
a radio frequency (RF) unit; and
a processor configured to:
control the RF unit;
receive, from a base station (BS), multi-user downlink control information (MU DCI) including a cyclic redundancy check (CRC) scrambled with an identifier (ID) of a user group including the UE and another UE, the MU DCI including:
a control information for decoding a physical downlink shared channel (PDSCH) for the UE;
another control information for decoding another PDSCH for the another UE;
an index allocated to the UE; and
another index allocated to the another UE;

decode the PDSCH using the control information and the index allocated to the UE; and decode the another PDSCH using the another control information and the another index allocated to the another UE.

* * * * *